Patented Nov. 16, 1937

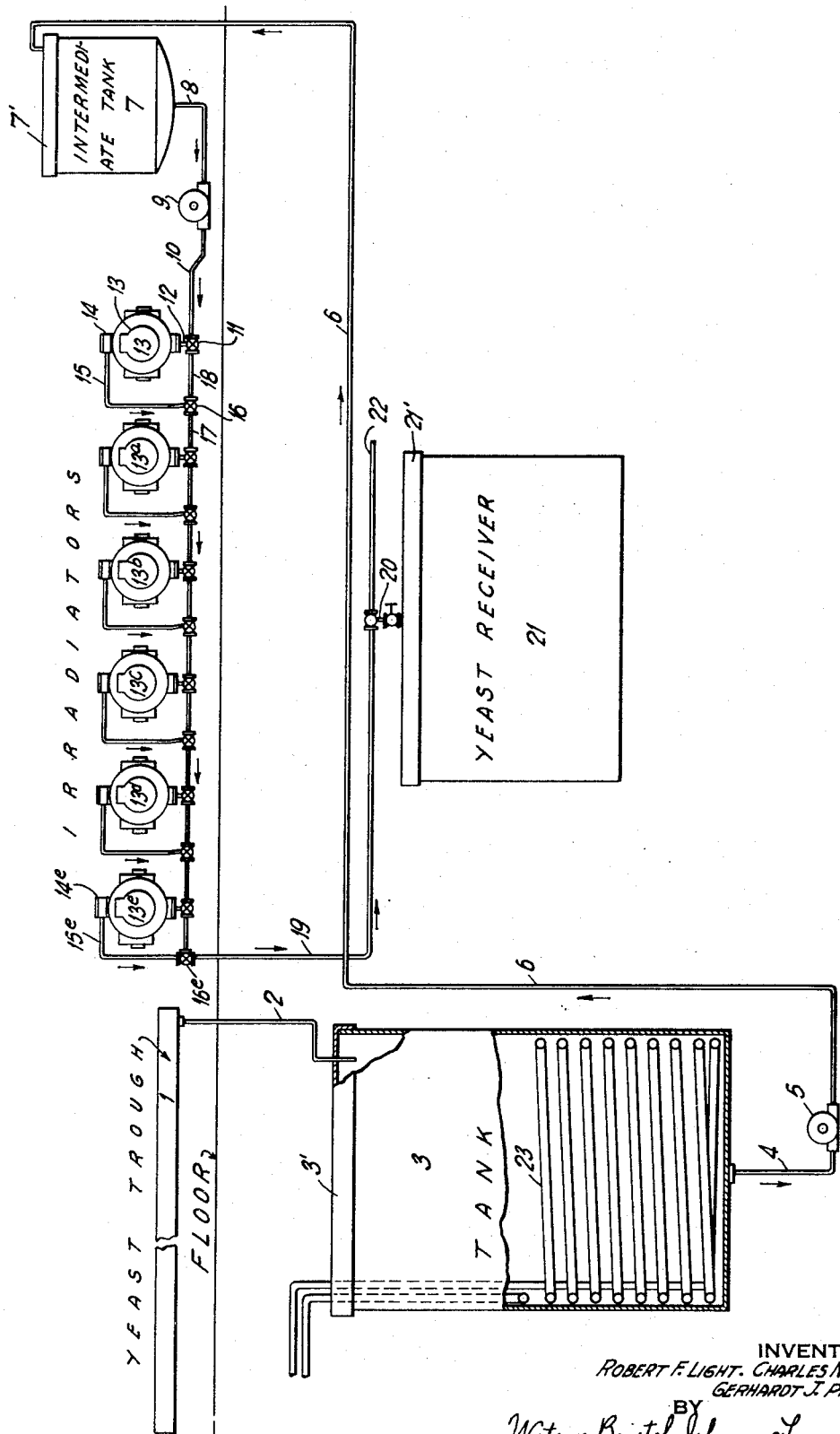

2,099,025

UNITED STATES PATENT OFFICE 2,099,025

PROCESS FOR TREATING LIQUID YEAST

Robert F. Light, Mount Vernon, Charles N. Frey, Scarsdale, and Gerhardt J. Patitz, Peekskill, N. Y., assignors to Standard Brands Incorporated, New York, N. Y., a corporation of Delaware Application December 13, 1935, Serial No. 54,222

2 Claims. (Cl. 99—13)

The invention relates to a process for treatment of live yeast, particularly for the irradiation of such yeast with ultra-violet rays and includes correlated steps and improvements whereby the vitamin content of yeast is enhanced and without otherwise affecting the therapeutic, keeping or baking properties thereof.

It is an object of this invention to provide a process whereby live yeast in liquid suspension and at a relatively low temperature is subjected to the influence of ultra-violet rays for the purpose of activating or increasing the vitamin D content thereof.

A further object of the invention is to provide a process for the activation of live yeast by ultra-violet rays which is highly efficient with respect to the ultra-violet energy, and which yields an activated yeast product which is of uniform potency.

Another object of the invention is to provide a process in accordance with which liquid live yeast may be treated with ultra-violet rays in a continuous manner, economically and readily on a commercial scale.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

In the practice of the invention, live yeast in the form of a liquid suspension containing the yeast as discrete particles is subjected to the influence of ultra-violet rays, preferably the range of 2300 to 4000 A. U., determined by a Hilger spectrograph, in the substantial absence of air or oxygen and in a turbulent state, or while under rather vigorous agitation. A procedure which may be followed in effecting the irradiation of the liquid suspension of live yeast is by the repeated subjecting, with intermediate or simultaneous mixing of the suspension, to the influence of the ultra-violet rays arising from a suitable source, as an electric arc, a carbon arc, the concentration thereof in sunlight by a suitable means, or preferably through the use of a quartz mercury vapor lamp of either the high or the low pressure type. This may be accomplished by passing the yeast in liquid suspension at a relatively low temperature through a plurality of zones of ultra-violet rays containing the desired range. More particularly the yeast in liquid suspension is passed in the form of a thin layer through a plurality of zones in series, in each of which zones it is subjected to the influence of the ultra-violet rays while agitated, and the suspension may be mixed intermediate the zones.

Further, the irradiation of the yeast in liquid suspension may be effected by using a suitable apparatus comprising a receptacle containing a source of ultra-violet rays as a quartz mercury vapor lamp. A liquid suspension of live yeast coming from separators, which remove the major part of the liquid, in the form of a stream and cooled to a temperature not exceeding 16° C. may be introduced into the base of a receptacle, and therein by an arrangement of baffles the said liquid suspension may be agitated and divided into a plurality of streams, for example into two streams. By means of the baffles, which extend into close proximity to an outer tube or casing surrounding the source of ultra-violet rays and which have an extended or spread-out portion at alternate baffles immediately adjacent the aforesaid tube, the liquid suspension of yeast is formed into a thin layer, preferably about 1/64 to 1/4 inch in thickness. The stream in this form is subjected to the influence of the desired range of ultra-violet rays, e. g. 2300 to 4000 A. U. The temperature at which the yeast suspension is treated should be relatively low and a temperature of from 4° to 16° C., more particularly 8° to 12° C. has been found to give satisfactory results. Furthermore, the streams of yeast in suspension after subjection to the influence of the ultra-violet rays may be combined with attendant mixing; introduced into a like receptacle in which the stream is agitated and divided, and again subjected to the influence of the ultra-violet rays as herein described.

This procedure gives an intimate admixture due to turbulence of the yeast suspension, and is conducive to the formation of a uniform degree of activation and distribution of the active material. After being repeatedly subjected to the influence of the ultra-violet rays by means of a number of receptacles in series, the treated suspension may be lead to a suitable vat, or tub wherein the desired low temperature is maintained and the water content may be reduced to the desired extent, by pressing, whereupon the yeast may be suitably packaged and is ready for marketing.

For a fuller understanding of the nature and objects of the invention, reference should be had to the following detailed description taken in connection with the accompanying drawing in which there is shown diagrammatically an arrangement suitable for treating a liquid suspension of yeast according to this invention.

The treatment of live yeast in liquid suspension containing liquid in which it was grown by subjecting it to the influence of ultra-violet rays may be effected in an apparatus arrangement comprising a yeast trough 1 into which the liquid yeast coming from the separators (not shown) is deposited and from which by means of a pipe 2, it is conducted to a tank 3 in which it remains at a suitably low temperature, for example at a temperature not exceeding 16° C., until such time as it is desired to process it further. From the tank 3 the yeast is conveyed by a pipe 4 to a pump 5, which in turn forces it through a conduit 6 to an intermediate supply tank 7.

A pump 9 draws the yeast from the tank 7 through a pipe 8 and causes it to flow through a pipe 10 to a valve 11 and thence by a pipe 12 to the irradiator, or receptacle containing a source of ultra-violet rays 13. In the irradiator the yeast is subjected substantially in the absence of oxygen to the influence of ultra-violet rays and passed therefrom through a top section 14 and thence through a pipe 15, a valve 16 and a pipe 17 to a second irradiator 13—a. The yeast then passes in succession, and in the same manner as through irradiator 13, through the irradiators 13—a, 13—b, 13—c, 13—d, and 13—e. From the last of the ultra-violet machines the yeast, now sufficiently treated, passes through a top section 14—e, a pipe 15—e and a valve 16—e to a conduit 19, from which it passes by means of a valved pipe 20 into a yeast receiver 21. An extension may be connected to the conduit 19 in the form of a pipe 22 which in turn may be connected with an additional yeast receiver. Thus the yeast is subjected to the influence of ultra-violet rays substantially in a closed system and in the absence of air or oxygen other than that dissolved in the liquid as is evident from the drawing.

If it is desired, or necessary to cause the yeast suspension to pass a given irradiator without being treated therein, it is only necessary to utilize a by-pass 18 between the pipes 10 and 17. A proper regulation of the valves 11 and 16 passes the yeast suspension directly by means of pipe 10, valve 11, pipe 18, valve 16 and pipe 17 to the irradiator 13—a. Furthermore, by utilizing a series of irradiators with by-passes as just described, it is possible to treat the yeast for any period of time and with any number of irradiators. Accordingly, if a desired increase in vitamin content can be accomplished with only three machines, it is readily possible to remove the remaining machines from the field of activity by simply so arranging the valve connections that the yeast suspension by-passes them.

The rate of flow through the apparatus and hence through the zones of ultra-violet rays may be controlled and regulated by means of the pump 9. This flow is determined by the desired increase in vitamin activity, and a suitable vitamin content is that a cake of compressed yeast weighing about one half ounce shall have a potency equivalent to one teaspoonful of a standard cod-liver oil.

In accordance with the foregoing procedure a liquid suspension of yeast may be irradiated and the vitamin content thereof increased to a desired extent. Thus if a small amount of activation is desired, the number of repeated subjections to the influence of the ultra-violet rays is reduced, and conversely if a greater degree of activation is desired, a larger number of passages are employed. The process makes it possible to obtain a definite, predetermined degree of activation, which is not attained by irradiation of yeast in the dry way. The subjection of live yeast in liquid suspension to irradiation is accompanied in contra-distinction to dry yeast by less destruction of the vitamins B and G while obtaining a definite vitamin D activity. This is so because each yeast cell in the liquid irradiated is directly subjected to an irradiation period, whereas when irradiated in dry condition only a part of the cells are exposed, and these for relatively long periods, resulting in destruction of vitamins B and G, whereas others of the cells receive no irradiation whatsoever. Further, it is to be observed that the yeast cell is a rather complex organism. It is not an inert, inactive material, like a cereal product, or a dry yeast, which has been heated and thus, at least partially, inactivated. There is rather a critical point in the irradiation of yeast if it is desired to retain the full enzyme activity and content of vitamins B and G and if the reproductive activity and keeping qualities are to remain unimpaired. In addition, ultra-violet irradiation promotes autolysis when the irradiation has proceeded to the point at which stability of the cell is effected. Also, ultra-violet rays hasten the oxidation of fats and thus promote rancidity.

As above indicated, it is desirable to maintain the temperature of the live yeast at a relatively low value during the period of irradiation. If the temperature is allowed to rise, especially in the neighborhood of the quartz separating layer, the transmissibility of the quartz is markedly affected and, hence, uniformity of results could not be obtained. The matter of uniformity is of especial importance from a commercial standpoint. Also the maintenance of a low temperature leads to non-destruction of the enzymes and the activity of the yeast cells is not affected. Accordingly, the life of the cells as well as the activity of the enzymes and the vitamin content are preserved.

A further effect of the low temperature is that thereby autolysis is prevented. If autolysis were to take place, the odor and flavor of the yeast would become objectionable, and further enzyme activity would be destroyed, as would be also the reproductive activity, and the vitamin content would be decreased.

Attention is directed to the fact that irradiation of yeast is not a simple problem. We have ascertained that to effect desirable commercial results and obtain a yeast of uniform vitamin and enzymic potency it is advisable to irradiate the yeast in fresh condition, i. e. as it comes from the fermenter after centrifuging. Thus the suspension contains liquid in which the yeast was grown and to which it has during its growth become accustomed. The cream which is subjected to irradiation is thus in an active state and fermentation is controlled by means of the low temperature. Under these conditions the yeast is in adjustment with the medium containing liquid in which it was grown, and the cells are in a state of turgor, which makes it possible to handle them successfully during the irradiation and subsequent drying. If the yeast is not in adjustment with the medium, the cells do not irradiate readily and properly, and a uniform activity cannot be obtained. Neither do such cells dry well when subjected to vacuum drying. If yeast is placed in distilled water or in water having a low salt content, there is likelihood that the cells will swell and burst, and in the event that the temperature is not maintained at a low value the yeast may undergo autolysis, which makes subsequent irradiation and drying not only difficult but a uniform product does not result.

Should the yeast be injured because of an unfavorable medium, the ability to undergo activation is reduced, and we have found that a yeast under adverse cultural conditions will be activated to only 75—D, whereas the same yeast under favorable cultural conditions and with the same activating influences will be activated to 200—D. Hence, in order to attain the conditions under which yeast may well be irradiated, it is necessary that the live cells be retained in a normal, healthy state, which is accomplished by having the yeast in liquid suspension containing liquid in which it was grown, and at a low temperature.

It is considered that the condition of the liquid in which the yeast is suspended and of the yeast cell itself is of particular importance, and as much so as the rays to which the yeast is subjected. There apparently is no great amount of penetration, and consequently the irradiation should be performed with the yeast in the form of discrete particles at the surface of the liquid, and the cells can thus be effectively irradiated if they are kept in a turbulent state in a thin film and with agitation such that the individual cells strike the quartz preferably several times during the period that they are being subjected to the influence of the rays. Furthermore, the rays effecting the irradiation may pass through a liquid film or layer surrounding the discrete particles of the yeast and also through a quartz layer, an air layer and another quartz layer, or a quartz layer, an air layer, another quartz layer, a water layer, and still another quartz layer, before contacting with the cells. The utilization of a closed system in which the yeast is irradiated in substantial absence of oxygen yields an irradiated yeast which is free from objectionable odor and flavor and in which the enzyme and reproductive activities, keeping qualities and vitamin content are maintained.

The irradiation of the live yeast in liquid suspension may be accomplished as above indicated by means of ultra-violet rays generated in a lamp of the arc type. Such a lamp permits the employment of a closed system, and a thin film of liquid is passed through the field of the arc in the form of a cylinder. Further, a film of water is interposed between the arc and the yeast, and the effect of the slight exposure to air which may attend the passage through the field would be decreased because of the effect of the arc. Further, it may be noted that when the light first passes through an air layer before contacting with yeast the very short waves are absorbed to a large extent and, hence, the tendency to zone formation is decreased.

It is found that the activation according to this process lends itself to a ready control, inasmuch as the discrete particles of yeast in suspension come under the influence of the ultra-violet rays and since the ergosterol which is converted into vitamin D is in the interior of the cell, the irradiation must contact and penetrate the individual or discrete cells.

Furthermore it is desired to indicate that the process herein described permits accurate control of the percentage of yeast in the suspension, the rate of flow past the source of ultra-violet rays, the intensity of the ultra-violet radiation and the total time of exposure.

Further, it is desired to add that the rate of flow, the concentration of the yeast and the time of irradiation are interdependent, from which it follows that if a too concentrated suspension of yeast is utilized there is a loss in effectiveness, which is also the result in the event that the rate of flow is not correlated with the concentration. It will be understood that the rate of flow and concentration will vary according to the type of irradiator being utilized. For the type illustrated in the drawing the preferred rate is about six gallons per minute of a yeast suspension having a concentration of from 30 to 50% of yeast.

Another feature of the irradiation procedure is that the osmotic pressure of the solution may be increased by adding salts, e. g. calcium acid phosphate or sodium chloride, to replace those removed when the yeast is washed; that is when the yeast is washed with water to remove the beer it might be desired to add a small amount of salts for the purpose of maintaining the turgidity of the yeast. The understanding of this action is that under normal conditions salts are present within the cell and adsorbed on the cell, and these salts pass into solution so that the cell remains in a medium to which it has become accustomed.

Various features which characterize the invention are as follows: the yeast cells are not destroyed—rather, the life thereof is preserved, as well as the enzyme and reproductive activities, the vitamin content and the keeping qualities; the vitamin D content is enhanced uniformly and without fermentative action or autolysis of the yeast cells; the live yeast in suspension is circulated during the period of irradiation so that each particle is caused to receive a maximum amount of irradiation; turbulence and accompanying agitation of the yeast suspension causes the yeast particles to strike the quartz layer separating the liquid suspension from the source of ultra-violet rays; irradiation is effected by rays having a range of 2300 to 4000 Angstrom units; the suspension is maintained at a low temperature, whereby autolysis is prevented and uniform conditions maintained during irradiation; living yeast is irradiated in the form of discrete particles in a liquid suspension preferably containing some liquid in which it was grown; air is excluded, thereby preventing undesirable effects on vitamins B and G as well as upon the flavor and palatability; the procedure is especially economical since it is about eight to ten times as effective as previously used methods; uniformity of activation is assured since practically all cells are equally exposed; the procedure is a continuous one, thus leading to exact and accurate duplication day after day, and a substantially complete utilization of the light or rays takes place.

Since certain changes may be made in carrying out the above process without departing from the scope of the invention, it is intended that all matters contained in the above description shall be interpreted as illustrative and not in a limiting sense.

It is also to be understood that the following claims are intended to cover all of the generic and specific features of the invention herein described, and all statements of the scope of the invention which, as a matter of language might be said to fall therebetween.

This application is in part a continuation of our co-pending application, Serial No. 542,056, filed June 4, 1931.

We claim:

1. A process for the manufacture of yeast which comprises separating live yeast as a suspension from liquid in which it was propagated, cooling, subjecting the live yeast in the form of discrete particles in liquid suspension to the influence of ultra-violet rays of the range 2300–4000 A. U. in a closed system in the substantial absence of oxygen, agitating while under the influence of said rays whereby yeast cells of uniform potency are obtained, and subsequently forming into pressed yeast.

2. A process for the manufacture of yeast which comprises separating live yeast as a suspension having a yeast concentration of 30 to 50% from liquid in which it was propagated, cooling, subjecting the live yeast in the form of discrete particles in liquid suspension containing liquid in which it was grown and at a temperature not exceeding 16° C. to the influence of ultra-violet rays of the range 2300–4000 A. U. in a closed system in the substantial absence of oxygen and at a rate of about 6 gallons per minute, agitating while under the influence of said rays whereby yeast cells of uniform potency are obtained, and subsequently forming into pressed yeast.

ROBERT F. LIGHT.
CHARLES N. FREY.
GERHARDT J. PATITZ.